(12) United States Patent
Zwirn

(10) Patent No.: US 10,989,805 B2
(45) Date of Patent: Apr. 27, 2021

(54) ACQUIRING INFORMATION REGARDING A VOLUME USING WIRELESS NETWORKS

(71) Applicant: Gil Zwirn, Petach-Tikva (IL)

(72) Inventor: Gil Zwirn, Petach-Tikva (IL)

( * ) Notice: Subject to any disclaimer, the term of this patent is extended or adjusted under 35 U.S.C. 154(b) by 0 days.

(21) Appl. No.: 16/515,764

(22) Filed: Jul. 18, 2019

(65) Prior Publication Data

US 2019/0339378 A1 Nov. 7, 2019

Related U.S. Application Data

(63) Continuation-in-part of application No. 15/430,033, filed on Feb. 10, 2017, now Pat. No. 10,405,222, which is a continuation-in-part of application No. 14/434,407, filed as application No. PCT/IB2013/058620 on Sep. 17, 2013, now abandoned.

(30) Foreign Application Priority Data

Oct. 18, 2012 (IL) .......................................... 222554

(51) Int. Cl.
*G01S 13/87* (2006.01)
*G01S 13/00* (2006.01)
*G01S 7/41* (2006.01)

(52) U.S. Cl.
CPC ............ *G01S 13/878* (2013.01); *G01S 7/412* (2013.01); *G01S 13/003* (2013.01)

(58) Field of Classification Search
CPC ... H04W 24/10; H04W 84/12; H04M 1/0264; G01V 3/08; G01S 7/41; G01S 13/874; G01S 13/765; G01S 13/003; G01S 13/582; G01S 13/878; G01S 7/412
See application file for complete search history.

(56) References Cited

U.S. PATENT DOCUMENTS

| 2008/0054893 | A1* | 3/2008 | Humphreys | ........... G01V 3/107 324/239 |
| 2014/0012505 | A1* | 1/2014 | Smith | ...................... G01V 3/08 702/2 |
| 2019/0361114 | A1* | 11/2019 | Kim | ...................... G01S 13/867 |

* cited by examiner

*Primary Examiner* — Thanh C Le
(74) *Attorney, Agent, or Firm* — Fresh IP PLC; Clifford D. Hyra; Aubrey Y Chen

(57) ABSTRACT

Methods and systems for outdoor advertising optimization and/or adaptive outdoor advertising are presented. One or more node signal receivers receive signals emitted by wireless network that are affected by physical phenomena such as reflections and scattering in the surrounding area. The received signals are processed to provide detection and tracking information regarding objects within a target volume. This information can then be employed to determine the optimal placement location or the optimal route for advertising platforms, and/or to select one or more advertisements on outdoor advertising platforms.

8 Claims, 4 Drawing Sheets

ACQUIRING INFORMATION REGARDING A VOLUME USING WIRELESS NETWORKS

CROSS-REFERENCE TO RELATED APPLICATIONS

This Application is a Continuation-in-part of U.S. patent application Ser. No. 15/430,033, filed on Feb. 10, 2017, which is a Continuation-in-part of U.S. patent application Ser. No. 14/434,407, filed on Apr. 9, 2015, now abandoned, which is a national phase of PCT/IB2013/058620, filed on Sep. 17, 2013, which claims priority to Israeli Patent Application 222554, filed on Oct. 18, 2012, all of which are incorporated herein by reference in their entirety.

FIELD OF THE INVENTION

The present invention relates generally to employing wireless networks for acquiring information regarding terrain and/or objects within a volume.

BACKGROUND OF THE INVENTION

Wireless Networks and Their Uses

Wireless networks are used to transfer information between two or more spatial locations which are not physically linked. The information may be of any kind, e.g., voice, still or moving images, text and so forth. The information is typically transferred using radio frequency (RF) and/or infrared radiation.

Some of the common types of wireless networks, divided according to coverage area and network topology, are:
(a) Wireless personal area networks (WPANs), such as Bluetooth networks, which interconnect devices within a relatively small area;
(b) Wireless local area networks (WLANs), linking two or more devices over a relatively short distance, usually providing internet connection through an access point;
(c) Wireless mesh networks, whose nodes are organized in mesh topology, in which each node forwards messages on behalf of other nodes. Such networks automatically reroute around faulty nodes;
(d) Wireless metropolitan area networks (wireless MANs), e.g., WiMax, which may connect several WLANs;
(e) Wireless wide area networks (wireless WANs), which typically cover large areas, e.g., between neighboring towns;
(f) Cellular networks or mobile networks, distributed over areas called cells, each of which served by at least one fixed-location transceiver, known as a cell site or base station. Each cell typically uses a set of radio frequencies and/or codes which is different from that of the immediate neighboring cells, so as to reduce interference. When joined together, multiple cells may provide coverage over wide geographic areas, enabling a large number of portable transceivers, such as mobile phones (including smart phones) and pagers, to communicate with each other and with fixed transceivers and telephones anywhere in the network, via base stations. Although originally intended for telephone conversations, cellular networks also routinely carry other types of data, using technologies such as: frequency division multiple access (FDMA), time division multiple access (TDMA), global system for mobile communications (GSM), code division multiple access (CDMA), general packet radio service (GPRS), wideband code division multiple access (W-CDMA), enhanced data rates for GSM evolution (EDGE), CDMA2000, orthogonal frequency division multiple access (OFDMA), and so forth; and
(g) Mobile satellite communications, based on telecommunication satellites. Typically used when other types of wireless connection are unavailable, e.g., in largely rural areas and remote locations, in aviation or in maritime platforms.

The location of mobile devices (e.g., cellular phones) connected to wireless networks is sometimes estimated using these networks. The estimation may be based on measurements made directly by the wireless network infrastructure and/or on external sources of information, e.g., global positioning system (GPS) trackers associated with the mobile devices. For example, U.S. patent application US2012/109853, by Culpepper, Smith and Vancleave, published on May 3, 2012, titled "Method and system for providing tracking services to locate an asset," discloses a method and system for asset location. Location data is received from a cellular transmitter associated with a selected asset, which location data includes data representative of a cellular receiver with which direct communication with the cellular transmitter is made. The location data is then communicated to a tracking service system, which tracking service system includes a database representative of geographic locations associated with the plurality of cellular receivers. The database is then queried with received location data so as to generate geographic tracking data associated with a location of a cellular receiver, the geographic tracking data including display data adapted to generate a map image including a representative of a location of the selected asset. The geographic tracking data is then communicated to an associated security agency so as to allow for viewing of an image generated in accordance with the display data and at least one of tracking and interception of the selected asset. In some embodiments, location data is also received from a GPS location system associated with the cellular transmitter. Another example is U.S. patent application US2010/120449, by Jakorinne, Kuisma and Paananen, published on May 13, 2010, titled "Method and system for refining accuracy of location positioning," which discloses a method and system for accurately determining the location of a mobile device. In the mapping phase, collected reference positioning data and collected cell data are used to map a covered area estimation, and in the actual location determination phase, the covered area estimation is calculated from actual environment data received through a wireless cellular communication network, and possibly but not necessarily from external databases. The covered area estimation comprises at least some of the following calculations: (i) estimation of base station location; (ii) estimation of transmission range; (iii) estimation of signal map; and (iv) estimation of area type. The actual location of the mobile device is determined from the covered area estimation based on relative comparison between the actual environment data and estimations (i)-(iv) and weight numbers resulted from the comparison. During both phases, a database is stored in the server and updated whenever new environment data is received. A further example is U.S. patent application US2011/0059752, by Garin, Do and Zhang, published on Mar. 10, 2011, titled "Concurrent wireless transmitter mapping and mobile station positioning," which discloses a method for concurrently estimating locations for one or more mobile stations and one or more mobile transmitters, said method comprising: receiving at a computing platform a plurality of range measurements from one or more mobile stations with unknown positions, the plurality of range measurements comprising one or more range measurements to one or more wireless transmitters with unknown positions and one or more range measurements to one or more wireless transmitters with known positions; and concurrently estimating locations for the one or more mobile stations with unknown positions and for the one or more wireless transmitters with unknown positions.

Wireless networks can also be used to estimate the location of multiple mobile devices as a function of time. Based on this information, one can create road maps, analyze traffic flow and provide dynamic route guidance for drivers. For example, U.S. patent application US2010/211301, by McClellan, published on Aug. 19, 2010, titled "System and method for analyzing traffic flow," discloses a system and method for analyzing traffic flow, comprising receiving location reports from a plurality of mobile devices, each of the location reports identifying a current location and current speed for a particular mobile device. For each of the location reports, the system identifies a current street from a street mapping database using the current location. The system stores the current speeds for the mobile devices so that each of the current speeds is associated with a street in the street mapping database. The current speeds may be stored in the street mapping database or in a separate database that is linked to the street mapping database. A further example is U.S. patent application US2010/057336, by Levine, Shinar and Shabtai, published on Mar. 4, 2011, titled "System and method for road map creation," which discloses a system and method for creation of a road map, the system comprising a plurality of navigation devices; and an application server to receive from the plurality of navigation devices time series of location points, and to create a road map based on the time series of location points. The method comprises receiving location points from a plurality of navigation devices, along with respective time stamps indicating the time of recordation of each of the location points; identifying at least one route according to the location points and respective time stamps; and creating a road map based on the at least one route. A further example is U.S. patent application US2011/098915, by Disatnik, Shmuelevitz and Levine, published on Apr. 28, 2011, titled "Device, system, and method of dynamic route guidance," which discloses a device, system and method of dynamic route guidance. For example, the method may include: calculating an optimal route from a first location, in which a navigation device is located, to a destination point entered by a user of said navigation device; receiving from the navigation device a travel update, indicating that the navigation device is located in a second location, wherein the second location is on said optimal route; and based on real-time traffic information and real-time road information, determining that an alternate route, from the second location to the destination point, is now an optimal route to the destination point.

Furthermore, mobile devices connected to wireless networks can be used to map network performance parameters as a function of space and/or time. For example, U.S. patent application US2006/246887, by Barclay, Benco, Mahajan, McRoberts and Ruggerio, published on Nov. 2, 2006, titled "Mapping of weak RF signal areas in a wireless telecommunication system using customers' mobile units," discloses a wireless mobile device, which includes an RF transmitter and receiver, where the receiver monitors signal strength of an RF signal from a base station. A control logic module compares the signal strength to a comparison level. The control logic module creates and stores a record in a memory module. The record includes a first signal strength level and parameters related to conditions existing at the time the comparing was done. The control logic module creates and stores the record if the level of said signal strength is less than the comparison level.

When fixed or mobile devices connected to a wireless network are associated with sensors capable of measuring one or more local physical parameters, the system can be used for detecting events in space and/or in time, e.g., for security purposes. For instance, U.S. patent application US2008/169921, by Peeters, published on Jul. 17, 2008, titled "Method and apparatus for wide area surveillance of a terrorist or personal threat," discloses methods and apparatuses for the wide area detection of major threats, including chemical, radiological or biological threats, using modified personal wireless devices, such as mobile phones, personal digital assistants (PDAs) or watches, combined with micro- and nano-sensor technologies. A "homeland security" chip is further provided, which combines the elements of geo-location, remote wireless communication and sensing into a single chip. The personal electronic devices can be further equipped for detecting various medically related threats. Similarly modified personal devices can be used to detect external threats that are person-specific. Another example is U.S. Pat. No. 7,952,476, by Causey, Andrus, Luu, Jones and Henry, issued on May 31, 2011, titled "Mobile security system," which discloses a mobile security system, wherein a detector communicates with a mobile device if an event has occurred. The event may be of various types, such as fire or motion. Once the mobile device receives the communication of the event occurrence, the mobile device may, among others, sound an alarm or communicate with a central monitoring system to notify emergency services of the occurrence. The mobile device may also communicate with another communication device, such as another cell phone or a computer, using various forms of communication. The detector may be an integral part of the mobile device, and may also be wholly separate.

Object Detection Using RF Sensors

Certain methods and systems known in the art employ sensors based on RF radiation for object detection outside the context of wireless networks.

In some systems, the object detection is based on active sensing. For instance, UK patent application GB2473743, by Bowring and Andrews, published on Mar. 23, 2011, titled "Detecting hidden objects," discloses a system and method for detecting and identifying hidden objects, for instance for airport security screening. Low power plane-polarized microwave radiation is directed towards a person, and scattered radiation is detected by a detector sensitive to polarization in an orthogonal plane (cross-polarization). The transmitted and received planes of polarization are varied, either by rotation of both transmitting and receiving antennas on a common platform, synchronized rotation of both, or switching between antennas having fixed polarizations. The transmitted frequency is modulated over a broad range, using wide-band frequency modulation continuous wave (FMCW). The output signal of the receiver over a period of time is compared with expected returns in a neural network to identify the nature of any hidden object, and can distinguish a large knife, small knife, handgun and so on. An ultrasound sonar or stereoscopic camera may determine the distance to the person. Another example is PCT application WO2009/090406, by Mehta, published on Jul. 23, 2009, titled "Microwave imaging system," which discloses a microwave imaging system for imaging a defined region, the system comprising a plurality of portable RF identification (RFID) tags, distributed around said region, for generating a plurality of RF signals and directing said signals to said defined region, and for receiving RF signals from said defined region; and means for transmitting the characteristics of said received signals to a remote processing station through a wireless communication channel, extracting image data from said received signals and constructing a corresponding image.

Other systems are based on passive sensing. For example, U.S. Pat. No. 8,179,310, by Westphal, issued on May 15, 2012, titled "Method for sensing a threat," discloses a method for threat analysis based on the passive radar principle, using the transmitter in navigation satellites, a plurality of receiving stations, which are operated distributed over wide regions, and at least one evaluation center. The receiving stations act as wake-up sensors, transmit their received signals to at least one evaluation center for comparison with expected signals from each navigation satellite, and sense a threat. Depending on the result, stationary or mobile radar systems can then be used to obtain more precise details relating to a conspicuous entity, making it possible to decide on currently required protective or defensive measures. A further example is U.S. patent application US2011/057828, by Brunet, published on Mar. 10, 2011, titled "Mapping method implementing a passive radar," which discloses a mapping method implementing a radar used in passive mode. It is possible to use such a radar for locating an object likely to reflect an electromagnetic wave transmitted by a transmitter the position of which is known. Movable objects capable of reflecting rays received from transmitters of opportunity are used. The method comprises the following operations: determining, in a distance-Doppler matrix of the radar, points relative to the deviations between the rays received directly from the transmitters and the rays reflected by the movable object; transferring to a map to be established a probable zone of location of singularities of the electromagnetic field transmitted or reflected by the ground; and crossing several probable zones during the movement of the movable object in order to obtain the location of the singularities.

Object Detection Using Wireless Network Infrastructure

Moreover, some methods and systems known in the art perform object detection using wireless network infrastructure. U.S. patent application US2009/0040952, by Cover and Andersen, published on Feb. 12, 2009, titled "Systems and methods for microwave tomography," discloses systems and methods for microwave tomography. According to various embodiments, signal strength values or other similar quality indications may be analyzed as they are received with packet data over a wireless network. The analysis may be used to determine the presence of a physical object substantially between communicating nodes in a wireless network. An output may be generated based on analyzed data. In addition, U.S. Pat. No. 6,745,038, by Callaway, Perkins, Shi and Patwari, issued on Jun. 1, 2004, title "Intra-piconet location determination and tomography," discloses a technique for intra-piconet location determination and tomography. This technique uses received signal strength indicator (RSSI) values in conjunction with transmitted power levels to determine the relative location of each device within a small network employing frequency hopped spread spectrum transmission. In addition to capability of location determination, the geometry of the devices in the network, as well as the path loss information between pairs of devices, may be used to infer the location of absorbers and reflectors within the piconet. This absorption and reflection information may be used in creating the piconet tomography. The approach described in this specification may be applied in conjunction with the Bluetooth PAN specification to determine device locations, mitigate the effects of multi-path, and perform indoor location and security functions, and other application functions requiring cost-effective location determination.

SUMMARY OF THE INVENTION

Embodiments of the present invention provide methods and devices for acquiring information regarding terrain and/or objects within a volume using wireless networks.

According to a first aspect of the invention, there is provided a method for outdoor advertising optimization and/or adaptive outdoor advertising using signals transmitted by wireless networks, said method comprising:
  receiving node signals transmitted by one or more nodes of wireless networks using one or more node signal receivers, wherein said node signals comprise node resultant signals received after traversing a medium, and wherein each of said one or more node signal receivers is configured to receive signals associated with one or more transmitting subject network nodes;
  detecting and tracking objects within a target volume, by applying the following processing steps to said received node resultant signals:
  (a) for each node signal receiver, applying matched filtering between said received node resultant signal and one or more of the waveforms of said transmitting subject network nodes, to obtain matched node resultant signals;
  (b) for each matched node resultant signal, applying object detection and outputting a detected object record, and for each output of said object detection, measuring one or more physical parameters;
  (c) if possible, associating one or more of the outputs of said object detection with one or more of the following:
    i. other outputs of said object detection, expected to correspond to the same physical object within said target volume, wherein said other outputs of said object detection relate to a different node signal receiver and/or a different transmitting subject network node;
    ii. outputs of said object detection produced at an earlier time, expected to correspond to the same physical object within said target volume, wherein said outputs of said object detection may relate to any node signal receiver and/or any transmitting subject network node; and
    iii. outputs of object compounding produced at an earlier time, expected to correspond to the same physical object within said target volume; and
  (d) for each association, compounding said physical parameter measurements relating to the corresponding object records and outputting a compounded object record, in order to obtain additional or more precise information regarding the corresponding physical object within said target volume.

Other aspects of the present invention are detailed in the claims.

BRIEF DESCRIPTION OF THE DRAWINGS

The invention for employing wireless networks for acquiring information regarding terrain and/or objects within a volume is herein described, by way of example only, with reference to the accompanying drawings. With specific reference now to the drawings in detail, it is emphasized that the particulars shown are by way of example and for purposes of illustrative discussion of the embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF EMBODIMENTS

System Description

Figure 1:
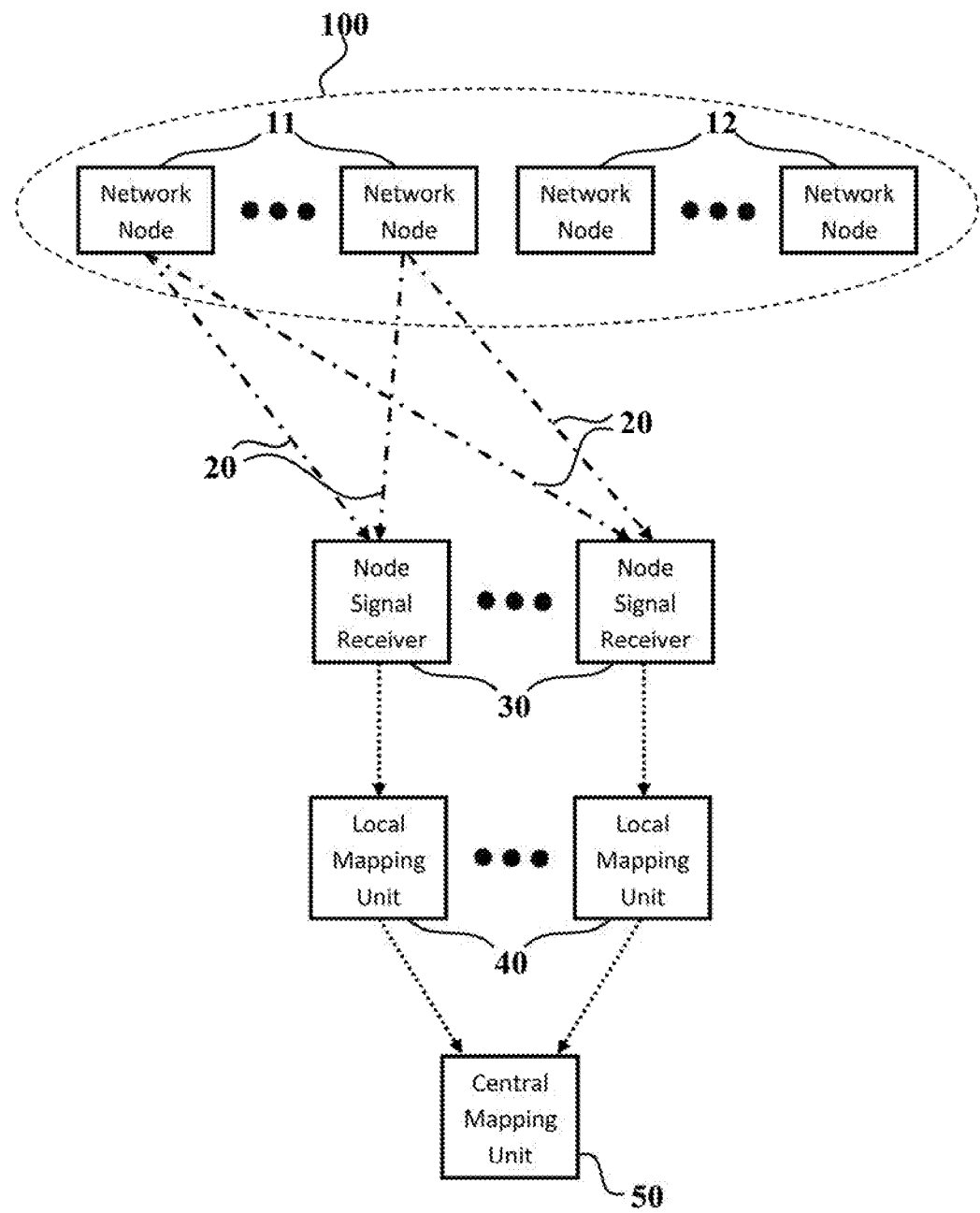
FIG. 1 is a schematic, pictorial illustration of a system for acquiring information regarding terrain and/or objects within a volume, in accordance with an embodiment of the present invention.

In broad terms, the present invention relates to methods and systems for acquiring information regarding terrain and/or objects within a volume ("target volume") using wireless networks.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In embodiments of the present invention, one or more wireless networks ("subject networks") include at least two nodes, wherein one or more of the nodes of the subject networks ("transmitting subject network nodes") transmit signals over time ("node signals"). The node signals traverse a medium, such as the atmosphere or free space, undergoing various physical phenomena, such as attenuation, reflection from various objects, scattering by various objects, refraction by various objects, diffraction, dispersion, multi-path, and so forth (the resulting signals are referred to as the "node resultant signals"), and are received by one or more receiving units ("node signal receivers"). The node resultant signals, received by the node signal receivers, are analyzed by one or more processing units ("mapping units").

In some embodiments, the system further includes one or more user units, capable of controlling the system and/or displaying its outputs. The user units may employ any computing platform, such as a server, a desktop, a laptop, a tablet computer, a smart phone, and the like.

In certain embodiments, all the transmitting subject network nodes and all the node signal receivers are stationary.

In other embodiments, at least one of the transmitting subject network nodes and/or at least one of the node signal receivers are mobile.

The subject network may be of any type known in the art, e.g., WPAN, WLAN, wireless mesh network, wireless MAN, wireless WAN, cellular network, mobile satellite communications network, radio network and/or television network. The transmitting subject network nodes may be of any kind known in the art, e.g., base stations and/or mobile phones in a cellular network.

If two or more of the transmitting subject network nodes transmit concurrently, the node resultant signals corresponding to the different node signals may be differentiated based on any method known in the art. For instance, each of the transmitting subject network nodes may employ a different frequency band, a different code type (e.g., linear frequency modulation, phase shift keying, frequency shift keying and so forth), a different set of code parameters, and/or a different polarization scheme (e.g., horizontal or vertical linear polarization, right-hand or left-hand circular polarization and so on), so that the resulting signal waveforms would be essentially orthogonal. Additionally or alternatively, multiple access methods may be employed, e.g., time division multiple access (TDMA), frequency division multiple access (FDMA), code division multiple access (CDMA), or orthogonal frequency division multiple access (OFDMA). In some embodiments, the transmitting subject network nodes may employ the same waveform, but be sufficiently separated spatially (e.g., the transmitting subject network nodes may be distant from each other and/or transmit at separated spatial angles) to support reasonable differentiation and acceptable levels of mutual interference.

In embodiments, each node signal receiver may be one of:
(a) Associated with a node of the subject network, which may be one of the transmitting subject network nodes or one of the other nodes; or
(b) A sensor configured to measure the node signals and/or the node resultant signals ("network sensor"). The network sensor may be one of:
  (i) Passive, only capable of receiving signals transmitted by other elements; or
  (ii) Active, capable of both transmitting and receiving signals.

In certain embodiments, each node signal receiver may employ one or more of the following:
(a) A single receive beam at any given time. The receive beam may either point at a constant direction or change its direction over time (by mechanical and/or electronic steering). Using this configuration, the angular measurement accuracy of the single node signal receiver typically matches the receive beam width, and different objects typically cannot be separated based on their spatial angle with respect to the node signal receiver;
(b) Several concurrent receive beams, configured to apply monopulse techniques, commonly employed by radar systems. Using this configuration, the angular measurement accuracy of the single node signal receiver may be much better than the receive beam width (e.g., by a factor of about 10); and
(c) Multiple concurrent receive beams, each pointing at a different spatial direction, configured as a staring array. Using this configuration, the angular measurement accuracy of the single node signal receiver may be much better than the receive beam width, and different objects may be separated based on their spatial angle with respect to the node signal receiver.

In some embodiments, all node signals are produces as a part of the normal operation of the wireless network. In other embodiments, some or all of the node signals are especially produced for acquiring information regarding the target volume; for example, one or more nodes may transmit signals at time varying directions, scanning the target volume over time, and employing radar-like processing.

In further embodiments, the analysis of the node resultant signals may be performed analogically, digitally, or using a combination thereof.

In certain embodiments, one or more mapping units are associated with at least one of the node signal receivers ("local mapping units"). In some embodiments, one or more central mapping units analyze the outputs of the local mapping units and/or the node resultant signals. In other embodiments, all node resultant signals are processed by one or more central mapping units.

In some embodiments, the central processing unit may be completely separated from the local mapping units. In other embodiments, one or more of the local mapping units may also serve the function of central mapping units. In further embodiments, the functions of the central mapping units may be divided between several local mapping units.

In further embodiments, the spatial location as a function of time for one or more of the transmitting subject network nodes and/or one or more of the node signal receivers is either measured directly or can be estimated. Location measurements can be made by means of any navigation system known in the art, e.g., using GPS and/or inertial navigation, wherein the resulting location information may or may not be filtered over time to enhance results. Additionally or alternatively, location estimation may be made employing any method known in the art, e.g., the methods of patent applications US2012/109853, US2010/120449 and/or US2011/0059752, referenced herein above.

An example for a system configuration, wherein all node signal receivers are not directly associated with nodes of the subject network, and are sensors configured to measure the node signals and/or the node resultant signals, can be seen in FIG. 1. The subject network 100 comprises transmitting subject network nodes 11 and non-transmitting subject network nodes 12. The node signals 20 traverse the medium, and the node resultant signals are received by the node signal receivers 30. These signals are then processed by the local mapping units 40 and/or central mapping unit 50. In the figure, wireless transmissions are marked by dash-dotted lines, and data lines, which may be wired or wireless, are marked by dotted lines.

Figure 2:
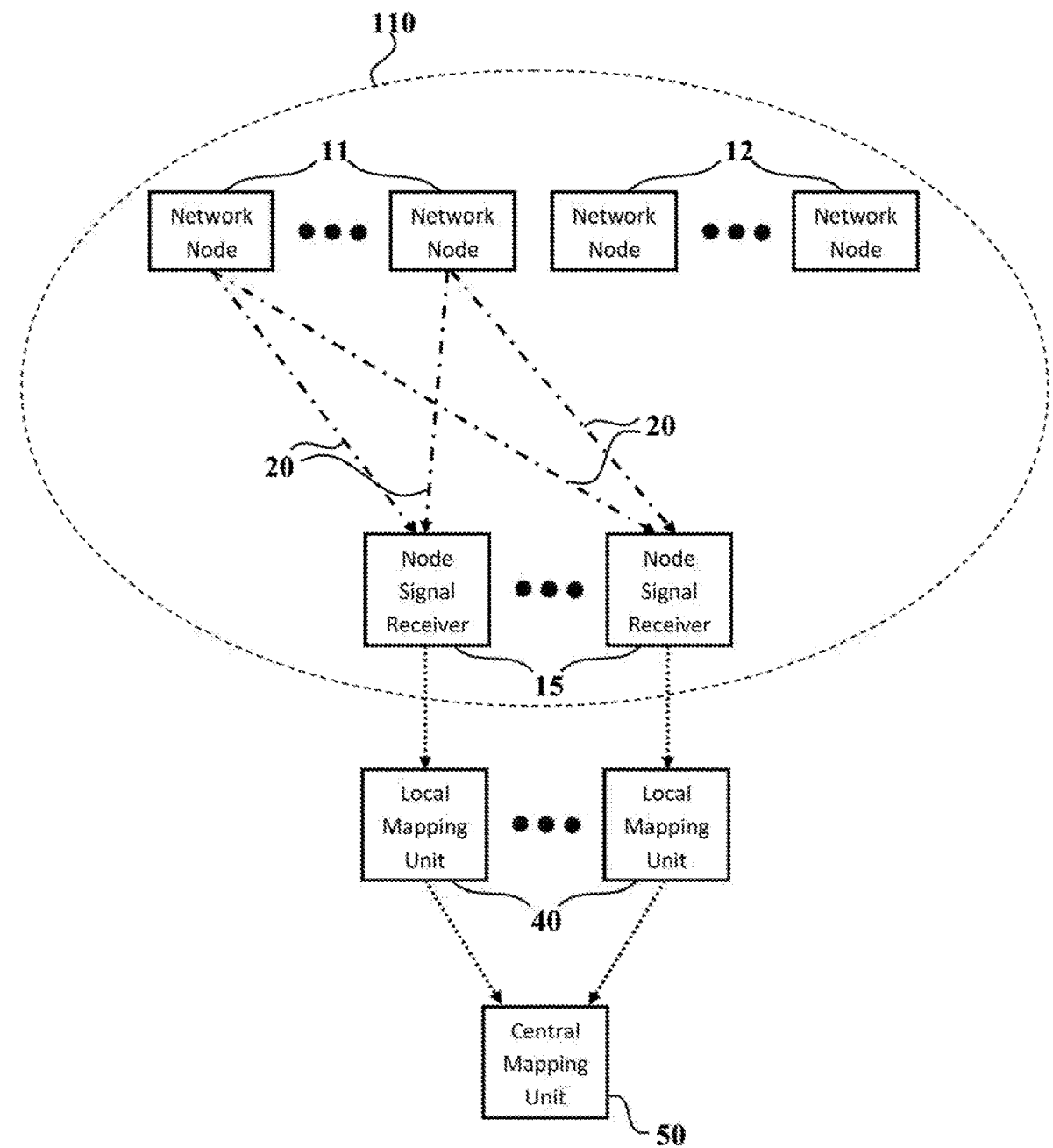
FIG. 2 is a schematic, pictorial illustration of a system for acquiring information regarding terrain and/or objects within a volume, in accordance with an embodiment of the present invention.
Figure 3:
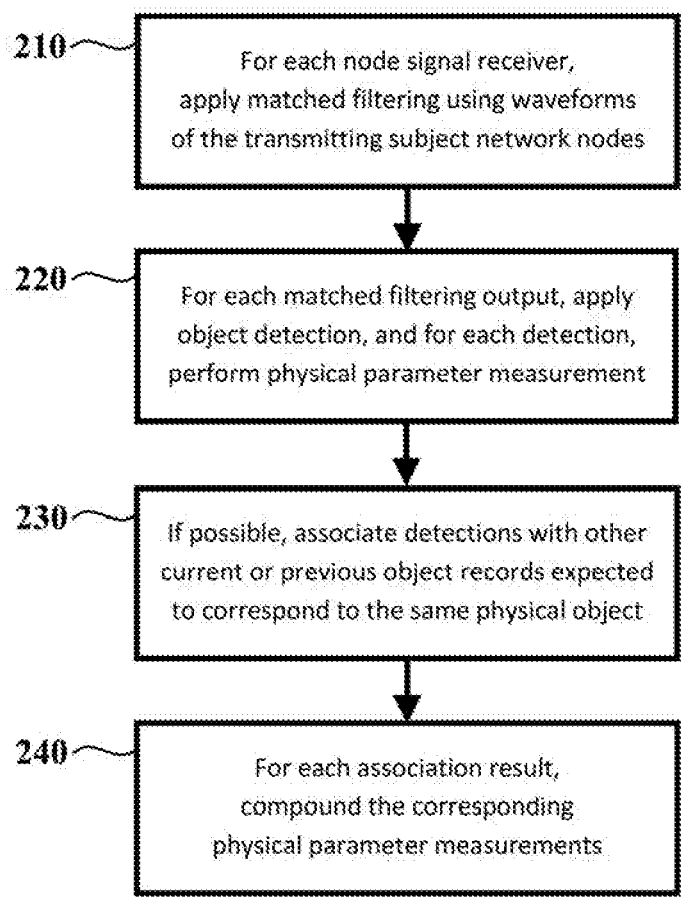
FIG. 3 is a schematic block diagram of detection based advertising facilitation, in accordance with an embodiment of the present invention.
Figure 4:
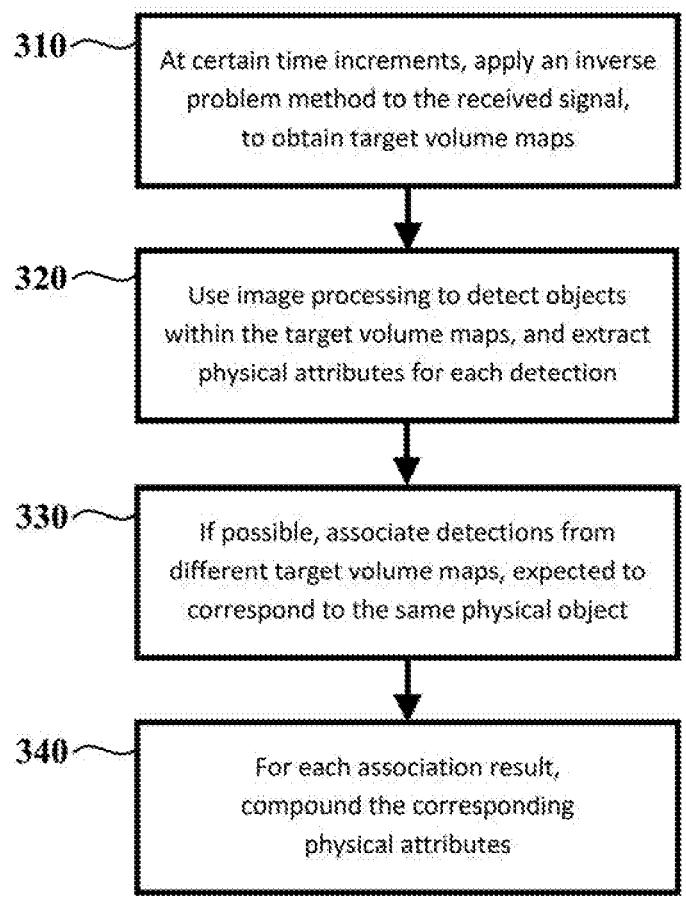
FIG. 4 is a schematic block diagram of imaging based advertising facilitation, in accordance with an embodiment of the present invention.

Another example for a system configuration, wherein all node signal receivers are associated with nodes of the subject network, can be seen in FIG. 2. The subject network 110 comprises transmitting subject network nodes 11, non-transmitting subject network nodes 12, and node signal receivers 15. The node signals 20 traverse the medium, and the node resultant signals are received by the node signal receivers 15. These signals are then processed by the local mapping units 40 and/or central mapping unit 50. In the figure, wireless transmissions are marked by dash-dotted lines, and data lines, which may be wired or wireless, are marked by dotted lines.

Physical Parameter Measurements

In embodiments, for at least one of the node signal receivers, for the node resultant signals associated with at least one of the transmitting subject network nodes, one or more of the following physical parameters ("signal attributes") is measured per node signal receiver and per transmitting subject network node, wherein the measurements may be made either for the entire node resultant signal or for certain time swaths thereof:

(a) Time difference, $\Delta t$, between node signal transmission by the applicable transmitting subject network node and node resultant signal reception by the applicable node signal receiver. This time difference is proportional to the distance, R, traversed by the node signal along its path through the medium:

$$\Delta t = R/c \quad (1)$$

where c is the speed of the signal's propagation within the medium, e.g., the speed of light;

(b) Phase difference, $\Delta\varphi$, between the transmitted node signal and the received node resultant signal. For example, if the node signal is known, the phase difference may be measured by applying a matched filter between the node signal and the node resultant signal. Alternatively, if the node signal is generally unknown, but certain sections of the node signal are predefined for the current communication protocol, the matched filter may be applied for one or more of these sections. Such techniques may necessitate phase synchronization between one or more of the transmitting subject network nodes and one or more of the node signal receivers.

The measured phase difference may be used to enhance the estimation of the distance traversed by the signal along its path through the medium, based on the following equation:

$$\Delta\varphi = \mathrm{mod}\left(\frac{2\pi}{\lambda}R, 2\pi\right) \quad (2)$$

where mod is the modulus operator and $\lambda$ is the wavelength of the transmitted signal;

(c) Power ratio, $R_p$, between the transmitted node signal and the received node resultant signal. For example, one may employ the received signal strength indication (RSSI), measuring the power of a signal received in a wireless communication node. This power ratio is affected by the distance traversed by the node signal along its path through the medium (the local signal power is inversely proportional to the squared distance from the transmitting subject network node, and to the medium losses, which increase with distance), as well as by physical attributes of objects along the path of the node signal (e.g., reflection coefficients of surfaces from which the signal has been reflected, and/or attenuation coefficients of objects along the path of the signal);

(d) Frequency difference, $f_D$, between the received node resultant signal and the transmitted node signal, i.e., the signal's Doppler shift. The frequency of the received node resultant signal may be measured by any method known in the art. For example, in cases where a transmitted node signal comprises multiple pulses, and a node signal receiver employs digital processing, one may apply Fourier analysis to one or more time gates of a received node resultant signal. Time gates of the received signal are defined as time intervals of a certain duration, wherein time is measured with respect to the rise-time of the last transmitted pulse, so that the number of samples for each time gate equals the number of pulses for which measurements have been made. According to the Doppler effect, in cases where the node signal interacts with M objects along its path, the Doppler shift equals:

$$f_D = \frac{1}{\lambda} \sum_{i=0}^{M+1} \left[\frac{d}{dt}(R_{i,i+1})\right] \quad (3)$$

wherein d/dt is the time derivative operator, and $R_{n,m}$ is the distance between the n'th and the m'th object along the signal's path, wherein the 0'th object is the applicable transmitting subject network node, the (M+1)'th object is the applicable node signal receiver, and the remaining objects are ordered according signal's interaction sequence with them. In the specific case where the signal does not interact with any moving elements along its path, the Doppler shift equals:

$$f_D = -\frac{1}{\lambda}(\vec{V_N} \cdot \widehat{R_N} - \vec{V_R} \cdot \widehat{R_R}) \quad (4)$$

wherein (•) is the dot-product operator, $\vec{V_N}$ is velocity vector of the applicable transmitting subject network node, $\vec{V_R}$ is the velocity vector of the applicable node signal receiver, $\widehat{R_N}$ is the unit vector of the signal's path through the medium just outside the applicable transmitting subject network node, and $\widehat{R_R}$ is the unit vector of the signal's path through the medium just outside the applicable node signal receiver, wherein all vectors are defined with respect to the same predefined coordinate system ("reference coordinate system");

(e) Direction from which the node resultant signal has arrived ("node resultant signal direction"), i.e., the unit vector of the node resultant signal's path through the medium just outside the applicable node signal receiver, and/or its projection on one or more predefined axes. This direction and/or its projections may be measured using any method known in the art. For example, when an applicable node signal receiver supports two or more concurrent receive beam configurations, one may employ monopulse techniques, which are commonly used in radar systems. Additionally or alternatively, when an applicable node signal receiver supports two or more different receive beam configurations, each of which employed at a different time, one may make use of a predefined scanning pattern, e.g., conical scan, which is ubiquitous in radar systems. The two or more receive beam configurations may differ from each other in at least one of the following parameters:

(i) Direction of maximal antenna gain on receive ("boresight");
(ii) Pattern of antenna gain on receive as a function of spatial angle with respect to the boresight ("antenna pattern");
(iii) Phase center; and/or
(iv) Polarization.

Additionally or alternatively, interferometric methods and/or multilateration methods may be employed. Note that, in cases where the node signal interacts with one or more objects along its path, the direction from which the node resultant signal arrives relates to the section of the path from the last object with which the node signal interacts to the node signal receiver; and/or (f) When there are multiple signal paths from a transmitting subject network node to a node signal receiver, i.e., in the presence of multi-path, the received node resultant signal is the coherent sum of the signals resulting from the different signal paths, each of which is referred to as a "node resultant signal component". In such cases, one or more of signal attributes (a)-(e) may be measured for one or more node resultant signal components. For that purpose, one may employ any method known in the art for separating the different received signal components, or for extracting the signal attributes directly from multiple received signal components. For example, one or more of the following methods may be used:

(i) One may apply an autocorrelation function to the received node resultant signal, and detect discernible peaks in the output ("autocorrelation peaks"). The criteria for a peak to be discernible may include, for example: the peak height provides a signal-to-noise ratio which exceeds a certain threshold; the ratio between the peak height and the maximal peak height exceeds a certain threshold; the peak width is lower than a certain threshold; the ratio between the peak height and the peak width exceeds a certain threshold; and so forth. Multiple autocorrelation peaks may be indicative of multiple node resultant signal components. One may employ the autocorrelation peaks to extract information regarding relative and/or absolute values of signal attributes of one or more node resultant signal components. For example, the value of Δt for the n'th resultant signal component equals the value of Δt for the earliest node resultant signal component plus the time difference between the first (leftmost) autocorrelation peak and the n'th autocorrelation peak;

(ii) If the node signal or parts thereof are known, one may apply cross-correlation between the received node resultant signal and the node signal. The output may be processed in a way similar to that of the autocorrelation output of method (i) above;

(iii) One may apply a matched filter to the received node resultant signal, configured to detect certain sections of the node signal which are expected to appear in specific parts of the signal, based on the current communication protocol. Such specific parts of the signal may include, for example, control information for data packets, which typically is part of the packets' header and/or trailer. The output may be processed in a way similar to that of the autocorrelation output of method (i) herein above;

(iv) One may employ the output of the autocorrelation function of method (i), the cross-correlation function of method (ii) and/or the matched filter of method (iii) herein (collectively the "correlation function output") to estimate the earliest or the strongest node resultant signal component (the "main node resultant signal component"). This may be performed, for example, by applying de-convolution between the received node resultant signal and the correlation function output. Additionally or alternatively, one may employ a regular decoding scheme, which may include error correction, and then reconstruct the main node resultant signal component. Once this component has been constructed, one may subtract it from the node resultant signal, to obtain the coherent sum of the remaining node resultant signal components. This process may be iteratively repeated several times, to separately extract the different node resultant signal components. One or more of signal attributes (a)-(e) may then be computed for each node resultant signal component; and/or (v) In cases where the different node resultant signal components do not overlap in time, one may simply separate them based on time of reception. One or more of signal attributes (a)-(e) may then be computed for each node resultant signal component.

In some embodiments, the signal attribute measurement may also involve comparing two or more node resultant signals so as to extract one or more physical attributes, each of which may be relative of absolute; wherein the term "relative physical attributes" in this context refers to the ratio and/or difference between the values of such physical attributes, associated with two or more node resultant signals. For example, one may apply cross-correlation between two or more node resultant signals or certain time swaths thereof, and detect discernible peaks in the output ("cross-correlation peaks"). The cross-correlation peaks may then be used, for instance, for estimating the difference in time duration ("relative time duration") from node signal transmission by the applicable transmitting subject network node to node resultant signal reception by the applicable node signal receiver, associated with two or more node resultant signals. When producing mapping information, the time duration measurements may be used, for instance, for multilateration.

The signal attribute measurement may be performed analogically, digitally, or using a combination thereof.

In some embodiments, the signal attribute measurement may be performed by the node signal receivers. This may also be done by one or more local mapping units associated with the applicable node signal receivers. Additionally or alternatively, analog or digital data from one or more node signal receivers may be transferred to one or more central mapping units, configured to perform the signal attribute measurements in part or in whole. The central mapping unit may then apply additional processing to these measurements. In further embodiments, signal attribute measurements made by one or more local mapping units may be transferred to a central mapping unit, which may apply additional processing to these measurements.

In further embodiments, information regarding the current spatial location and/or previous spatial locations as a function of time ("location history") for one or more of the transmitting subject network nodes and/or one or more of the node signal receivers is transferred to one or more of the mapping units (local mapping units and/or central mapping units). The current locations and/or location history may be employed by the mapping units to estimate the values for one or more of the signal attributes for direct paths between the transmitting subject network nodes and the node signal receivers ("nominal signal attribute values"), without any objects along the node signals' path except for the nominal medium, wherein the nominal medium may be, e.g., the atmosphere or free space.

In even further embodiments, the mapping units may compound the nominal signal attribute values with the measured signal attribute values, to provide information regarding physical phenomena within the medium ("medium attributes"). For instance, one may compute for at least one of the node signal receivers and at least one of the transmitting subject network nodes, for either the applicable node resultant signals or for one or more node resultant signal components, for either the entire node resultant signal or for certain time swaths thereof:

(a) The difference between the distance R traversed by the node signal along its path through the medium ("measured distance") and the direct distance D between the applicable transmitting subject network node and the applicable node signal receiver ("physical distance"). This distance difference ("path delay distance") equals the path delay times the speed of signal's propagation within the medium. The measured distance may be based on the time difference signal attribute and/or on the phase difference signal attribute. The physical distance may be computed either as the geometric distance or as the optic distance within the medium, taking into account refraction effects within the medium that do not result from objects along the node signal's path (e.g., atmospheric refraction, caused by spatial variations in the local atmospheric temperature, pressure and humidity levels);

(b) The measured power ratio signal attribute, divided by the power ratio between the transmitted node signal and the expected node resultant signal. The result ("path attenuation factor") is the attenuation factor resulting from objects along the node signal path, which may be caused by actual attenuation, reflections with reflection coefficients lower than 1.0, scattering and the like. The expected node resultant signal may be computed based on the transmitted signal power and the expected reduction in power as a function of distance traversed through the medium, using either the measured distance or the physical distance;

(c) The measured power ratio signal attribute, divided by the power ratio between the transmitted node signal and the node resultant signal expected based on the assumption that the node signal traverses along a straight line or along an optic path, taking into account refraction effects within the medium that do not result from objects along the node signal's path. The result ("path delay attenuation factor") may be used to estimate the distance R traversed by the node signal along its path through the medium, in cases where the time difference signal attribute is not computed. The distance R may be approximately derived from the path delay attenuation factor by imposing a certain assumption. For example, if we attribute the entire path delay attenuation factor to losses within the medium due to path delay, we can estimate the difference between R and D. This assumption may be appropriate, e.g., for the earliest node resultant signal component; and/or (d) The measured frequency difference signal attribute, minus the expected Doppler shift; wherein the expected Doppler shift is based on the relative spatial location and velocity vectors of the applicable transmitting subject network node and the applicable node signal receiver. As demonstrated in eq. 3 and eq. 4, the result ("path Doppler shift") is affected by the following:

(i) The difference in spatial angle between the unit vector of the signal's path through the medium just outside the applicable transmitting subject network node, and the unit vector connecting the applicable transmitting subject network node and the applicable node signal receiver (either using a straight line or using a curve which takes into account refraction effects within the medium that do not result from objects along the node signal's path);

(ii) The difference in spatial angle between the unit vector of the signal's path through the medium just outside the applicable node signal receiver, and the unit vector connecting the applicable node signal receiver and the applicable transmitting subject network node (either using a straight line or using a curve which takes into account refraction effects within the medium that do not result from objects along the node signal's path); and (iii) The motion velocity of each object along the node signal's path and the unit vector of the signal's path just before and just after the interaction with the corresponding objects along the node signal's path.

If one or more of the parameters affecting the path Doppler shift is known or can be estimated, one can extract information regarding some or all of the remaining affecting parameters. For example, the node resultant signal direction attribute provides information regarding affecting parameter (ii).

Terrain and/or Volume Mapping

In embodiments, the mapping units may analyze one or more node resultant signals and/or signal attributes and/or medium attributes for one or more transmitting subject network nodes and one or more node signal receivers, either at a specific time swath or as a function of time, to extract information regarding objects along the signal's paths ("mapping information"). For example, the mapping information may include at least one of: digital terrain models (DTM), digital surface models (DSM), as well as detection, localization, characterization, classification and/or tracking data of objects within volumes and/or over terrains, said information may or may not be time dependent and/or space dependent. The term "objects" here relates to static and/or dynamic objects, each of which may be inanimate or animate, e.g., animals, human beings, various vehicles, buildings and so forth.

In some embodiments, the mapping information may be produced using at least one of the following methods:

(a) Analyzing one or more node resultant signals and/or signal attributes and/or medium attributes over time and applying a change detection method. Any change detection method known in the art may be employed. For example, if the applicable transmitting subject network node and node signal receiver are immobile, significant changes in the signal attributes and/or the medium attributes are indicative of new objects, changed objects and/or objects whose location has changed within the volume. The measured changes in the signal attributes and/or the medium attributes may be employed for localization, characterization and/or classification purposes;

(b) Applying a forward problem method, using a-priori information and/or certain assumptions regarding the terrain and/or volume. The a-priori information may include:

(i) Information previously produced by systems or methods of the present invention;

(ii) Measurements made by the subject network and/or additional hardware in the subject network's site; and/or (iii) External information, such as DTM and/or DSM databases.

Any forward problem method known in the art may be employed, e.g., ray tracing and/or any wave propagation model appropriate for the frequency band, the network configuration (e.g., area-to-area versus point-to-point) and the medium configuration (e.g., models for indoor versus outdoor applications);

(c) Applying a forward problem method, using a-priori information and/or certain assumptions regarding the terrain and/or volume, as in method (b) above, and comparing the measured node resultant signals and/or the signal attributes and/or the medium attributes to computed values;

(d) Iteratively applying a forward problem method, wherein in each step a hypothesized terrain and/or volume map is defined, and the outputs of the forward problem method, when compared to one or more measured node resultant signals and/or signal attributes and/or medium attributes, are used to adjust the hypothesized terrain and/or volume map. Note that such an iterative method may be continuously applied to the measurements as a function of time, to inherently provide time dependent mapping information; and/or (e) Applying an inverse problem method to one or more measurable physical parameters, such as the local attenuation coefficient and/or the local reflection coefficient and/or spatial location, each of which may or may not be time dependent. Any inverse problem method known in the art may be employed, e.g., Hough transform based algorithms, such as computed tomography, microwave tomography and/or diffraction tomography.

(f) Compounding one or more node resultant signals, so as to extract information regarding objects along the signals' paths. This may be performed, for example, using interferometry. Additionally or alternatively, one may employ multilateration techniques for certain objects, e.g., based on relative time duration measurements. Another example is treating two or more node signal receivers as elements of a receiving array, and applying any beamforming technique known in the art to the node resultant signals.

In further embodiments, wherein at least one of the transmitting subject network nodes and/or at least one of the node signal receivers moves over time (e.g., a mobile phone in a cellular network, moving with the person carrying it), node resultant signals and/or signal attributes and/or medium attributes, measured at multiple spatial configurations of the transmitting subject network nodes and/or the node signal receivers, are employed for producing mapping information.

In even further embodiments, wherein at least one of the objects within the target volume moves over time, node resultant signals and/or signal attributes and/or medium attributes, measured when the at least one of the objects within the target volume is in different locations, are employed for producing mapping information.

An example for an inverse problem method for producing the mapping information ("multi-path reconstruction method"):

(a) This method assumes that the earliest node resultant signal component, which is still affected by multi-path (i.e., excluding the component associated with the direct path from the applicable transmitting subject network node to the applicable node signal receiver), referred to herein as the "first multi-path signal component", is the result of a exactly a single reflection along the signal path ("single reflection assumption"). For the first multi-path signal component of a specific node resultant signal, the possible spatial locations of the reflecting surface producing the first multi-path signal component ("component reflecting surface") may be defined using at least one of the following criteria:
  (i) The component reflecting surface is located over an ellipsoid surface, whose foci correspond to the locations of the applicable transmitting subject network node and the applicable node signal receiver, wherein the ellipsoid is the figure formed from all points whose sum of distances from the two foci equals the measured distance for the first multi-path signal component;
  (ii) The node resultant signal direction for the first multi-path signal component corresponds to the spatial angle between the component reflecting surface and the node signal receiver; and/or
  (iii) In the presence of a non-zero Doppler shift, and assuming that the component reflecting surface is approximately immobile, the path Doppler shift defines a group of allowable spatial angles between the component reflecting surface and the node signal receiver.

The method employs first multi-path signal components corresponding to multiple node resultant signals, and registers the possible spatial locations of reflecting surfaces for each of the first multi-path signal components over a three-dimensional space, in a manner similar to that of the Hough transform. Actual reflective surfaces are located where registrations from a relatively high number of first multi-path signal components are present. Note that this technique compounds information from a large number of node resultant signals, so that outliers being a consequence of the inaccuracy of the single reflection assumption are inherently rejected;
  (b) Once the first multi-path signal components for two or more of the node resultant signals have been addressed, additional signal components may be analyzed in a similar fashion, using one or more hypotheses regarding the path traversed by each signal component, for example:
    (i) The signal component results from exactly a single reflection along the signal path; and/or
    (ii) The signal component results from exactly two signal reflections along the signal's path, one of which has already been found in a previous step;
  (c) After generating a map of the spatial location of reflective surfaces, their reflection coefficient and/or the attenuation along paths between them may be estimated. For example, for each first multi-path signal component, one may assign to the corresponding reflective surface a reflection coefficient corresponding to the path delay attenuation factor. For reflective surfaces affecting the first multi-path signal component of more than one node resultant signal, one may assume that the maximal estimation of the reflection coefficient over all node signals is correct, and assign the remaining power loss to attenuation along the signal's path.

Object Detection

Detection of objects within the target volume may be performed by analyzing mapping information. This may be done using one or more of the following:
  (a) Applying a local and/or a global threshold to the power of the mapping information;
  (b) Applying automatic recognition of various object types, such as cars, motorcycles, bicycles, people, animals, and so forth, using any automatic target recognition (ATR) method known in the art; and
  (c) Applying motion detection, by arranging the mapping information in accordance to its acquisition time and applying any change detection algorithm known in the art.

Additionally or alternatively, for at least one of the node signal receivers, for the node resultant signals associated with at least one of the transmitting subject network nodes, one may apply matched filtering between the transmitted waveform and the received node resultant signals ("transmit-receive matched filtering"). Strong reflectors on the signal path from the applicable transmitting subject network node to the node signal receiver are expected to produce relatively high power in the transmit-receive matched filtering output. Reflectors can thus be detected by applying a local and/or a global threshold to the power of the transmit-receive matched filtering output.

Object Classification

In some embodiments, the mapping units may classify objects within the target volume. Any classification and/or target filtering method known in the art may be employed for these purposes. For instance:
  (a) One may compute object characteristics and compare them to predefined reference models. Object characteristics may include, for instance, estimated object dimensions, motion velocity, reflection coefficient, attenuation coefficient and so forth. The comparison to reference models may be based on any technique known in the art, for example:
    (i) Applying one or more thresholds to each object characteristic, to obtain a set of binary values. Predefined logic criteria may then be applied to the set of binary values, e.g., the sum of the binary values should exceed a certain number;
    (ii) Applying one or more thresholds to each object characteristic, to obtain a set of binary values, and then using the Dempster-Shafer theory;
    (iii) Defining a multi-dimensional characteristic space, whose dimensionality matches the number of object characteristics, and mapping object types to subspaces; and/or
    (iv) Employing neural-network algorithms.
  (b) The presence of a subject network node in immediate proximity to the object may be used as a source of information. For instance, cellular phones are typically carried by humans but not by animals; and/or
  (c) Volumes wherein certain object types are not expected to be found may be defined, thus reducing false alarms.

In further embodiments, the mapping units may detect and handle only objects of specific types ("relevant objects"), e.g., humans, and not respond to other types of objects. The above described classification methods may be used for these purposes as well.

Coping with Electronic Counter Measures

In even further embodiments, the mapping units may have to cope with electronic counter measures (ECM). Any method known in the art may be applied to detect and cope with ECM. Some examples for techniques for detecting ECM:
  (a) Noise jammers, e.g., spot, sweep or barrage jammers, may be detected based on their signal pattern as a function of space and/or time; and/or
  (b) Phantom objects, produced by deceptive jammers, may be discerned from true objects based on self consistency checks of the signal attributes associated with such objects. For example, mismatch between the time derivative of the measured distance from one or more of the node signal receivers and the measured Doppler shifts for these node signal receivers may be indicative of phantom objects.

Some examples for techniques for coping with ECM:
- (a) The waveform of noise jammers may be estimated, and the subject network's waveforms may be adjusted so as not to be affected by the noise jammers; and/or
- (b) Detected objects which are determined to be phantom objects may be discarded.

Examples for Applications

The systems and methods of the present invention may be used for a wide variety of applications. Many of these applications are relevant for smart cities. Some examples for applications:
- (a) Security systems, which may detect, localize, characterize, classify and/or track objects within volumes and/or over terrains. The security systems may also detect and/or classify carried objects, such as concealed weapons, explosives and/or drugs. The coverage volumes of these security systems may match the type of subject network or networks used. For example, WPANs may be employed for personal security systems; WLANs for home security systems or for security systems for large buildings or facilities, such as shopping centers, airport terminals, oil rigs and the like; and cellular networks for securing large areas, e.g., borders, defense zones surrounding certain facilities or agricultural areas, as well as large buildings, such as shopping centers, airport terminals and so forth;
- (b) Estimation of the location of people and/or vehicles as a function of time, e.g., for traffic analysis, or for determining optimal placement locations for outdoor advertising, wherein the people and/or vehicles do not necessarily carry a transmitting subject network node such as a mobile phone. Various network types may be employed, including, e.g., WLANs and/or cellular networks;
- (c) Obstacle detection for moving vehicles, e.g., airplanes, trains, trucks, busses and cars. The subject network may be installed on the moving vehicle itself, and/or on other platforms, each of which may be mobile or immobile; and
- (d) Terrain and/or volume mapping systems, e.g., for cartography. Such systems are typically designed to acquire information regarding immobile objects, whereas mobile elements are discarded.

One of the advantages of the systems and methods of the current invention is that the information regarding the terrain and/or the objects within the volume may be acquired using wireless networks, which are very common nowadays. One may use existing networks, and/or add new ones. In some embodiments, only software changes to a wireless network system may be required. In other embodiments, only hardware changes are required, or a combination of hardware and software changes. For instance, one or more base stations for cellular or WLAN networks may be added in order to enhance the system's performance, e.g., for improving the object location accuracy. As a byproduct, the performance of the wireless network as a communication system may improve as well.

The fact that wireless networks are used:
- (a) Contributes to the systems' cost-effectiveness. Already existing production lines may be adapted to accommodate the present invention, and previously installed wireless networks may be retrofitted to support the new features; and
- (b) Limits the additional radiation within the atmosphere, which results from employing the systems and methods, thus reducing people's exposure to unnecessary radiation.

Advertising Facilitation

One of the possible uses of the present invention is outdoor advertising optimization and/or adaptive outdoor advertising (collectively "advertising facilitation").

The term "outdoor advertising", also known as "out-of-home advertising", refers to advertising that reaches the customers while they are outside their homes. Outdoor advertising may include one or more of:
- (a) Outdoor advertising placed on stationary objects ("stationary outdoor advertising"), such as billboards and street furniture (e.g., bus shelters, news racks, or mail kiosks); and
- (b) Outdoor advertising placed on moving objects ("transit outdoor advertising"), such as buses, trucks, food trucks, and taxis.

The term "outdoor advertising optimization" refers to selecting the optimal placement locations (for stationary outdoor advertising) and/or the optimal routes (for transit outdoor advertising) for outdoor advertising.

The term "adaptive outdoor advertising" refers to advertisement selection on outdoor advertising media with the aim of meeting the needs and interests of nearby customers. Adaptive outdoor advertising may apply to any format of outdoor advertising where the order and/or timing of showing the advertisements is not predefined, e.g., digital billboards. In some embodiments, the advertisement selection may be out of a predefined set of advertisements. In other embodiments, the advertisement selection may be out of a time variable set of advertisements.

Advertising Facilitation: Detection Based

In some embodiments, advertising facilitation may comprise ("detection based advertising facilitation"):
- (a) Receiving node resultant signals using one or more node signal receivers, wherein each of the one or more node signal receivers is configured to receive signals associated with one or more transmitting subject network nodes;
- (b) Detecting and tracking objects within the target volume, by applying the following processing steps to the received node resultant signals:
  - (i) Step 210: For each node signal receiver, apply matched filtering between the received node resultant signal and one or more of the waveforms of the transmitting subject network nodes, to obtain the "matched node resultant signals";
  - (ii) Step 220: For each matched node resultant signal, apply object detection, and for each output of object detection, measure one or more physical parameters;
  - (iii) Step 230: If possible, associate one or more of the outputs of object detection with one or more of the following:
    - (1) Other outputs of object detection, expected to correspond to the same physical object within the target volume, wherein the other outputs of object detection relate to a different node signal receiver and/or a different transmitting subject network node;
    - (2) Outputs of object detection produced at an earlier time, expected to correspond to the same physical object within the target volume, wherein the outputs of object detection may relate to any node signal receiver and/or any transmitting subject network node; and (3) Outputs of object compounding produced at an earlier time (the term "object compounding" is defined herein below), expected to correspond to the same physical object within the target volume; and (iv) Step 240: For each association result of step 230, compound the physical parameter measurements relating to the corresponding object records ("object compounding"), in order to obtain additional or more precise information regarding the corresponding physical object within the target volume, wherein the term "object record" refers to an output of either object detection or object compounding.

In certain embodiments, advertising facilitation may further comprise one or more of the following (each of the following steps may be applied after any of steps 220, 230, or 240):

(a) Step 250: For one or more object records, analyze the associated physical parameter measurements to obtain object classification and/or recognition (an output of object classification and/or recognition is referred to as an "object class", and the possible values of an object class are referred to as "object types");

(b) Step 260: Store some or all of the data associated with one or more of the object records in a database for further analysis;

(c) Step 270: Display some or all of the data associated with one or more of the object records, or certain functions of such data, to one or more users on one or more user units;

(d) Step 280: Analyze one or more of the object records so as to determine the optimal placement location for one or more stationary outdoor advertising platforms;

(e) Step 285: Analyze one or more of the object records so as to determine the optimal route for one or more transit outdoor advertising platforms; and (f) Step 290: Analyze one or more of the object records so as to select one or more advertisements on one or more outdoor advertising platforms.

In embodiments, any of the waveforms of the transmitting subject network nodes in step 210 may be one or more of the following:

(a) Fully known in advance;

(b) Partially known in advance, wherein only the part known in advance is used for the matched filtering;

(c) Partially known in advance, wherein the unknown part or certain portions thereof are estimated based on the communication protocol used by the transmitting subject network node; and (d) Not known in advance, and partially or fully estimated based on the communication protocol used by the transmitting subject network node.

In some embodiments, applying object detection in step 220 comprises applying a global and/or a local energy threshold to the matched node resultant signal. In further embodiments, applying object detection in step 220 may comprise:

(a) Producing a range-Doppler map, commonly employed in radar systems, by doing the following:

(i) Select several consecutive transmission sequences of the transmitting subject network node, used for matched filtering in step 210 ("node sequences"). Each node sequence may be, for instance, a pulse of a group of pulses;

(ii) For each node sequence, arrange the matched node resultant signal as a function of time. Note that time is linearly correlated to the bi-static range with respect to the transmitting subject network node and the node signal receiver. All samples of the arranged matched node resultant signal will thus be referred to as "range-gates", and the corresponding sample indices will be referred to as "range-gate indices"; and (iii) For each range-gate index, apply a discrete Fourier transform (e.g., using fast Fourier transform, or FFT) to the corresponding range-gates of the arranged matched node resultant signals over all selected node sequences. The output is referred to as a "range-Doppler map", since for each range-gate index, the frequency associated with each element of the discrete Fourier transform output describes the local Doppler shift.

(b) Applying a global and/or local energy threshold to the range-Doppler map.

In some cases, applying object detection in step 220 may further comprise suppressing reflections from immobile objects, by applying a high-pass filter to the matched node resultant signal.

In certain embodiments, one or more of the physical parameters measured in step 220 may include information regarding one or more of the following:

(a) The object's location;

(b) The object's orientation;

(c) The object's dynamic properties, e.g., velocity and/or acceleration;

(d) The object's spatial dimensions; and (e) The object's reflection cross-section (RCS) model.

Some examples for such physical parameters and possible estimation methods are described herein in the section entitled "Physical Parameter Measurements".

In other embodiments, the association in step 230 comprises looking for objects with sufficiently similar attributes, wherein the attributes may include one or more of the following:

(a) Parameters relating to spatial location, in any coordinate system, e.g., bi-static range with respect to a transmitting subject network node and a node signal receiver and/or spatial angle with respect to a node signal receiver;

(b) Parameters relating to the velocity vector or projections thereof, in any coordinate system, e.g., the Doppler shift with respect to a node signal receiver;

(c) Spatial dimensions, or projections thereof; and (d) Parameters relating to the reflection cross-section model.

In further embodiments, the compounding of the physical parameter measurements in step 240, when relating to multiple measurements made essentially at the same time, may comprise one or more of the following:

(a) Using any multi-lateration method known in the art, e.g., triangulation, to improve the assessment of object's spatial location and/or dynamic properties based on information (e.g., bi-static range and/or spatial angle measurements) associated with different transmitting subject network nodes and/or different node signal receivers;

(b) Using projections of the object's spatial dimensions, estimated by multiple transmitting subject network nodes and/or multiple node signal receivers, to improve the object's spatial dimensions estimation; and (c) Using reflection cross-section measurements made using multiple transmitting subject network nodes and/or multiple node signal receivers to estimate one or more parameters relating to the object's reflection cross-section model. Such parameters may be indicative of the object's shape and/or dimensions.

In even further embodiments, the compounding of the physical parameter measurements in step 240, when relating to multiple measurements made at different times, may comprise one or more of the following:
- (a) Using any filter known in the art, e.g., a Kalman filter, to estimate the behavior of some of the object's attributes as a function of time, e.g., its location and dynamic properties; and
- (b) Using any pattern recognition method known in the art to analyze the object's dynamic behavior over time.

In other embodiments, the object classification and/or recognition in step 250 may employ any method known in the art, e.g., neural networks, deep learning, hidden Markov models (HMM), and the like. Additionally or alternatively, one may employ one or more of the methods described herein in the section entitled "Object Classification".

In some embodiments, the optimal placement location for one or more stationary outdoor advertising platforms is determined in step 280 by any applicable optimization method known in the art, e.g., Newton's method, simulated annealing, genetic algorithms, and so forth, and using one or more optimization criteria. In certain embodiments, at least one of the optimization criteria used in step 280 may be a function of one or more of the following:
- (a) The local density of objects as a function of space and time, as derived from the object records. For example, one may prefer to place stationary outdoor advertising platforms in areas typically including many objects throughout most of the day;
- (b) The velocity distribution of objects as a function of space and time, as derived from the object records. For instance, one may prefer to place stationary outdoor advertising platforms in areas usually including many slow moving objects;
- (c) The local density of objects as a function of space and time, as derived from the object records, taking into account only object records associated with one or more specific object types. For example, one may prefer to place stationary outdoor advertising platforms in areas which are typically crowded with pedestrians throughout most of the day;
- (d) The velocity distribution of objects as a function of space and time, as derived from the object records, taking into account only object records associated with one or more specific object types. For instance, one may prefer to place stationary outdoor advertising platforms in areas suffering often from heavy traffic, so drivers may potentially look at the stationary outdoor advertising platforms for relatively long time periods; and
- (e) The availability of a line-of-sight from a potential location of the stationary outdoor advertising platform to spatial regions of interest, wherein the spatial regions of interest are determined based on one or more of:
  - (i) The local density of objects as a function of space and time, as derived from the object records;
  - (ii) The velocity distribution of objects as a function of space and time, as derived from the object records;
  - (iii) The local density of objects as a function of space and time, as derived from the object records, taking into account only object records associated with one or more specific object types;
  - (iv) The velocity distribution of objects as a function of space and time, as derived from the object records, taking into account only object records associated with one or more specific object types; and
  - (v) Predefined priorities for spatial regions, which may either be time independent or time dependent.

In other embodiments, the optimal route for one or more transit outdoor advertising platforms is determined in step 285 by any route optimization method known in the art, e.g., Dijkstra's algorithm, A* search algorithm, and so forth, and using one or more optimization criteria. In embodiments, at least one of the optimization criteria used in step 285 may be a function of one or more of the following:
- (a) The local density of objects as a function of space and time, as derived from the object records;
- (b) The velocity distribution of objects as a function of space and time, as derived from the object records;
- (c) The local density of objects as a function of space and time, as derived from the object records, taking into account only object records associated with one or more specific object types. For example, one may prefer that bus routes pass through areas which are typically crowded with pedestrians;
- (d) The velocity distribution of objects as a function of space and time, as derived from the object records, taking into account only object records associated with one or more specific object types. For instance, one may prefer that bus routes pass through areas where pedestrians are typically walking slowly, and may potentially look at the transit outdoor advertising platforms for relatively long time periods; and
- (e) The availability of a line-of-sight from one or more spatial locations along the potential route of the transit outdoor advertising platform to spatial regions of interest, wherein the spatial regions of interest are determined based on one or more of:
  - (i) The local density of objects as a function of space and time, as derived from the object records;
  - (ii) The velocity distribution of objects as a function of space and time, as derived from the object records;
  - (iii) The local density of objects as a function of space and time, as derived from the object records, taking into account only object records associated with one or more specific object types;
  - (iv) The velocity distribution of objects as a function of space and time, as derived from the object records, taking into account only object records associated with one or more specific object types; and
  - (v) Predefined priorities for spatial regions, which may either be time independent or time dependent.

In further embodiments, the one or more advertisements on one or more outdoor advertising platforms are selected in step 290 by any applicable optimization method known in the art, and using one or more optimization criteria. In even further embodiments, at least one of the optimization criteria used in step 290 may be a function of one or more of the following:
- (a) The advertisement content;
- (b) The advertisement duration;
- (c) The advertisement format (e.g., still image or video);
- (d) The typical object sizes within the advertisement (e.g., large objects may be preferred for viewing from far away);
- (e) The predefined priority of the advertisement;
- (f) Predefined priorities for spatial regions, which may either be time independent or time dependent;
- (g) The current density distribution of objects in the vicinity of the outdoor advertising platform, as derived from the object records;

(h) The current velocity distribution of objects in the vicinity of the outdoor advertising platform, as derived from the object records;
(i) The current density distribution of objects in the vicinity of the outdoor advertising platform, as derived from the object records, taking into account only object records associated with one or more specific object types;
(j) The current velocity distribution of objects in the vicinity of the outdoor advertising platform, as derived from the object records, taking into account only object records associated with one or more specific object types; and
(k) The availability of a line-of-sight from the outdoor advertising platform to spatial regions of interest, wherein the spatial regions of interest are determined based on one or more of:
  (i) The current density distribution of objects in the vicinity of the outdoor advertising platform, as derived from the object records;
  (ii) The current velocity distribution of objects in the vicinity of the outdoor advertising platform, as derived from the object records;
  (iii) The current density distribution of objects in the vicinity of the outdoor advertising platform, as derived from the object records, taking into account only object records associated with one or more specific object types;
  (iv) The current velocity distribution of objects in the vicinity of the outdoor advertising platform, as derived from the object records, taking into account only object records associated with one or more specific object types; and
  (v) Predefined priorities for spatial regions, which may either be time independent or time dependent.

Advertising Facilitation: Imaging Based

Additionally or alternatively, advertising facilitation may comprise ("imaging based advertising facilitation"):
(a) Receiving node resultant signals using one or more node signal receivers, wherein each of the one or more node signal receivers is configured to receive signals associated with one or more transmitting subject network nodes;
(b) Detecting and tracking objects within the target volume, by applying the following processing steps:
  (i) Step 310: At certain time increments, apply an inverse problem method to the received node resultant signal, to obtain target volume maps;
  (ii) Step 320: Apply image processing to the target volume maps, to detect objects within them, and for each detected object, extract one or more physical attributes;
  (iii) Step 330: If possible, associate detected objects in different volume maps, expected to correspond to the same physical object within the target volume, wherein the different volume maps relate to different times; and
  (iv) Step 340: For each association result of step 330, compound the physical attributes relating to the corresponding detected objects, in order to obtain additional and/or more precise information regarding the objects.

The term "imaging object record" refers to an output of either step 320 or step 340 (e.g., an output of either object detection or physical attribute compounding), associated with a certain physical object within the target volume.

In certain embodiments, advertising facilitation may further comprise one or more of the following (each of the following steps may be applied after any of steps 320, 330, or 340):
(a) Step 350: For one or more imaging object records, analyze the associated physical attributes (before or after compounding), to obtain object classification and/or recognition (an output of object classification and/or recognition is referred to as an "object class", and the possible values of an object class are referred to as "object types");
(b) Step 360: Store some or all of the data associated with one or more of the imaging object records in a database for further analysis;
(c) Step 370: Display some or all of the data associated with one or more of the imaging object records, or certain functions of such data, to one or more users on one or more user units;
(d) Step 380: Analyze one or more of the imaging object records so as to determine the optimal placement location for one or more stationary outdoor advertising platforms;
(e) Step 385: Analyze one or more of the imaging object records so as to determine the optimal route for one or more transit outdoor advertising platforms; and
(f) Step 390: Analyze one or more of the imaging object records so as to select one or more advertisements on one or more outdoor advertising platforms.

In some embodiments, the object detection in step 320 may be based on one or more of the following:
(a) Applying a local and/or a global threshold to the power of the target volume maps;
(b) Automatic recognition of various object types, such as cars, motorcycles, bicycles and so forth, using any automatic target recognition (ATR) method known in the art; and
(c) Motion detection, by arranging the target volume maps in accordance with their acquisition time and applying any change detection algorithm known in the art.

In further embodiments, the physical attributes in step 320 may include one or more of the following:
(a) Parameters relating to spatial location;
(b) Parameter relating to orientation;
(c) Parameters relating to dynamic properties, such as the motion pattern, the velocity vector and/or projections thereof, or the acceleration vector and/or projections thereof;
(d) Spatial dimensions, or projections thereof; and
(e) Parameters relating to the reflection cross-section model.

In other embodiments, the association in step 330 comprises looking for objects with sufficient similarity in one or more of the physical attributes.

In further embodiments, the compounding of the physical attributes in step 340 comprises one or more of the following:
(a) Using any filter known in the art, e.g., a Kalman filter, to estimate the behavior of some of the object's attributes as a function of time, e.g., its location and dynamic properties; and
(b) Using any pattern recognition method known in the art to analyze the object's dynamic behavior over time.

In even further embodiments, the object classification and/or recognition in step 350 may employ any method known in the art, e.g., neural networks, deep learning, hidden Markov models (HMM), and the like. Additionally or alternatively, one may employ one or more of the methods described herein in the section entitled "Object Classification".

In some embodiments, the optimal placement location for one or more stationary outdoor advertising platforms is determined in step 380 by any applicable optimization method known in the art, e.g., Newton's method, simulated annealing, genetic algorithms, and so forth, and using one or more optimization criteria. In certain embodiments, at least one of the optimization criteria used in step 380 may be a function of one or more of the following:
 (a) The local density of objects as a function of space and time, as derived from the imaging object records. For example, one may prefer to place stationary outdoor advertising platforms in areas typically including many objects throughout most of the day;
 (b) The velocity distribution of objects as a function of space and time, as derived from the imaging object records. For instance, one may prefer to place stationary outdoor advertising platforms in areas usually including many slow moving objects;
 (c) The local density of objects as a function of space and time, as derived from the imaging object records, taking into account only imaging object records associated with one or more specific object types. For example, one may prefer to place stationary outdoor advertising platforms in areas which are typically crowded with pedestrians throughout most of the day;
 (d) The velocity distribution of objects as a function of space and time, as derived from the imaging object records, taking into account only imaging object records associated with one or more specific object types. For instance, one may prefer to place stationary outdoor advertising platforms in areas suffering often from heavy traffic, so drivers may potentially look at the stationary outdoor advertising platforms for relatively long time periods; and
 (e) The availability of a line-of-sight from a potential location of the stationary outdoor advertising platform to spatial regions of interest, wherein the spatial regions of interest are determined based on one or more of:
  (i) The local density of objects as a function of space and time, as derived from the imaging object records;
  (ii) The velocity distribution of objects as a function of space and time, as derived from the imaging object records;
  (iii) The local density of objects as a function of space and time, as derived from the imaging object records, taking into account only imaging object records associated with one or more specific object types;
  (iv) The velocity distribution of objects as a function of space and time, as derived from the imaging object records, taking into account only imaging object records associated with one or more specific object types; and
  (v) Predefined priorities for spatial regions, which may either be time independent or time dependent.

In other embodiments, the optimal route for one or more transit outdoor advertising platforms is determined in step 385 by any route optimization method known in the art, e.g., Dijkstra's algorithm, A* search algorithm, and so forth, and using one or more optimization criteria. In embodiments, at least one of the optimization criteria used in step 385 may be a function of one or more of the following:
 (a) The local density of objects as a function of space and time, as derived from the imaging object records;
 (b) The velocity distribution of objects as a function of space and time, as derived from the imaging object records;
 (c) The local density of objects as a function of space and time, as derived from the imaging object records, taking into account only imaging object records associated with one or more specific object types. For example, one may prefer that bus routes pass through areas which are typically crowded with pedestrians;
 (d) The velocity distribution of objects as a function of space and time, as derived from the imaging object records, taking into account only imaging object records associated with one or more specific object types. For instance, one may prefer that bus routes pass through areas where pedestrians are typically walking slowly, and may potentially look at the transit outdoor advertising platforms for relatively long time periods; and
 (e) The availability of a line-of-sight from one or more spatial locations along the potential route of the transit outdoor advertising platform to spatial regions of interest, wherein the spatial regions of interest are determined based on one or more of:
  (i) The local density of objects as a function of space and time, as derived from the imaging object records;
  (ii) The velocity distribution of objects as a function of space and time, as derived from the imaging object records;
  (iii) The local density of objects as a function of space and time, as derived from the imaging object records, taking into account only imaging object records associated with one or more specific object types;
  (iv) The velocity distribution of objects as a function of space and time, as derived from the imaging object records, taking into account only imaging object records associated with one or more specific object types; and
  (v) Predefined priorities for spatial regions, which may either be time independent or time dependent.

In further embodiments, the one or more advertisements on one or more outdoor advertising platforms are selected in step 390 by any applicable optimization method known in the art, and using one or more optimization criteria. In even further embodiments, at least one of the optimization criteria used in step 390 may be a function of one or more of the following:
 (a) The advertisement content;
 (b) The advertisement duration;
 (c) The advertisement format (e.g., still image or video);
 (d) The typical object sizes within the advertisement (e.g., large objects may be preferred for viewing from far away);
 (e) The predefined priority of the advertisement;
 (f) Predefined priorities for spatial regions, which may either be time independent or time dependent;
 (g) The current density distribution of objects in the vicinity of the outdoor advertising platform, as derived from the imaging object records;
 (h) The current velocity distribution of objects in the vicinity of the outdoor advertising platform, as derived from the imaging object records;
 (i) The current density distribution of objects in the vicinity of the outdoor advertising platform, as derived from the imaging object records, taking into account only imaging object records associated with one or more specific object types;

(j) The current velocity distribution of objects in the vicinity of the outdoor advertising platform, as derived from the imaging object records, taking into account only imaging object records associated with one or more specific object types; and
(k) The availability of a line-of-sight from the outdoor advertising platform to spatial regions of interest, wherein the spatial regions of interest are determined based on one or more of:
  (i) The current density distribution of objects in the vicinity of the outdoor advertising platform, as derived from the imaging object records;
  (ii) The current velocity distribution of objects in the vicinity of the outdoor advertising platform, as derived from the imaging object records;
  (iii) The current density distribution of objects in the vicinity of the outdoor advertising platform, as derived from the imaging object records, taking into account only imaging object records associated with one or more specific object types;
  (iv) The current velocity distribution of objects in the vicinity of the outdoor advertising platform, as derived from the imaging object records, taking into account only imaging object records associated with one or more specific object types; and
  (v) Predefined priorities for spatial regions, which may either be time independent or time dependent.

Integration with Additional Systems

In certain embodiments, the systems of the present invention may be integrated with additional sensors, providing supplementary information to the mapping units. For example, in security applications, the additional sensors may include sensors traditionally employed in security and surveillance systems, such as motion sensors, photo-electric beams, shock detectors, glass break detectors, still and/or video cameras, which may be optic and/or electro-optic, other electro-optic sensors, radars, lidar systems, and/or sonar systems.

In further embodiments, the systems of the present invention may be integrated with other systems, to provide combined functionality. For example, in obstacle detection applications, a system of the present invention may be integrated with another type of obstacle detection system, e.g., based on image processing of information acquired by one of more video cameras.

The invention claimed is:

1. A method for outdoor advertising optimization and/or adaptive outdoor advertising using signals transmitted by wireless networks, said method comprising:
  receiving node signals transmitted by one or more nodes of wireless networks using one or more node signal receivers, wherein the node signals comprise node resultant signals received after traversing a medium, and wherein each of the one or more node signal receivers is configured to receive signals associated with one or more transmitting subject network nodes;
  detecting and tracking objects within a target volume, by applying the following processing steps:
  a. at certain time increments, applying an inverse problem method to the received node resultant signal, to obtain target volume maps;
  b. applying image processing to the target volume maps, to detect objects within them, and for each detected object, extract one or more physical attributes;
  c. if possible, associating detected objects in different volume maps, expected to correspond to the same physical object within the target volume, wherein the different volume maps relate to different times; and
  d. for each association result, compounding the physical attributes relating to the corresponding detected objects, in order to obtain additional and/or more precise information regarding the objects,
  wherein an imaging object record is an output of either object detection or physical attribute compounding, associated with a certain physical object within the target volume, and wherein the detecting and tracking objects within the target volume further comprises one or more of the following:
  a. for one or more imaging object records, analyzing the associated physical attributes (before or after compounding), to obtain object classification and/or recognition, outputting an object class, being on or more of a set of predefined object classes;
  b. storing some of all of the data associated with one or more of the imaging object records in a database;
  c. displaying some or all of the data associated with one or more of the imaging object records, or certain functions of such data, to one or more users;
  d. analyzing one or more of the imaging object records so as to determine an optimal placement location for one of more stationary outdoor advertising platforms;
  e. analyzing one or more of the imaging object records so as to determine an optimal route for one or more transit outdoor advertising platforms; and
  f. analyzing one or more of the imaging object records so as to select one or more advertisements on one or more outdoor advertising platforms.

2. The method according to claim 1, wherein the image processing applied to the target volume maps to detect objects within them is based on one or more of the following:
  a. applying a local and/or a global threshold to the power of the target volume maps;
  b. automatic recognition of various object classes using automatic target recognition (ATR) methods; and
  c. motion detection, by arranging the target volume maps in accordance with their acquisition time and applying change detection algorithms.

3. The method according to claim 1, wherein the one or more physical attributes include one or more of the following:
  a. a parameter relating to spatial location;
  b. a parameter relating to orientation;
  c. a parameter relating to dynamic properties;
  d. a spatial dimension, or projections thereof; and
  e. a parameter relating to the reflection cross-section model.

4. The method according to claim 1, wherein the association of detected objects in different volume maps comprises looking for objects with sufficient similarity in one or more of the physical attributes.

5. The method according to claim 1, wherein the compounding of the physical attributes comprises one or more of the following:
  a. using a filter to estimate the behavior of some of the object's attributes as a function of time; and
  b. using a pattern recognition method to analyze the object's dynamic behavior over time.

6. The method according to claim 1, wherein the optimal placement location for one or more stationary outdoor advertising platforms is determined by an optimization method using one or more optimization criteria, and wherein at least one of the optimization criteria is a function of one or more of the following:
  a. the local density of objects as a function of space and time, as derived from the imaging object records;
  b. the velocity distribution of objects as a function of space and time, as derived from the imaging object records;
  c. the local density of objects as a function of space and time, as derived from the imaging object records, taking into account only imaging object records associated with one or more specific object classes;
  d. the velocity distribution of objects as a function of space and time, as derived from the imaging object records, taking into account only imaging object records associated with one or more specific object classes; and
  e. the availability of a line-of-sight from a potential location of the stationary outdoor advertising platform to spatial regions of interest, wherein the spatial regions of interest are determined based on one or more of:
    i. the local density of objects as a function of space and time, as derived from the imaging object records;
    ii. the velocity distribution of objects as a function of space and time, as derived from the imaging object records;
    iii. the local density of objects as a function of space and time, as derived from the imaging object records, taking into account only imaging object records associated with one or more specific object classes;
    iv. the velocity distribution of objects as a function of space and time, as derived from the imaging object records, taking into account only imaging object records associated with one or more specific object classes; and
    v. predefined priorities for spatial regions, which may either be time independent or time dependent.

7. The method according to claim 1, wherein the optimal route for one or more transit outdoor advertising platforms is determined by an optimization method using one or more optimization criteria, and wherein at least one of the optimization criteria is a function of one or more of the following:
  a. the local density of objects as a function of space and time, as derived from the imaging object records;
  b. the velocity distribution of objects as a function of space and time, as derived from the imaging object records;
  c. the local density of objects as a function of space and time, as derived from the imaging object records, taking into account only imaging object records associated with one or more specific object classes;
  d. the velocity distribution of objects as a function of space and time, as derived from the imaging object records, taking into account only imaging object records associated with one or more specific object classes; and
  e. the availability of a line-of-sight from one or more spatial locations along the potential route of the transit outdoor advertising platform to spatial regions of interest, wherein the spatial regions of interest are determined based on one or more of:
    i. the local density of objects as a function of space and time, as derived from the imaging object records;
    ii. the velocity distribution of objects as a function of space and time, as derived from the imaging object records;
    iii. the local density of objects as a function of space and time, as derived from the imaging object records, taking into account only imaging object records associated with one or more specific object classes;
    iv. the velocity distribution of objects as a function of space and time, as derived from the imaging object records, taking into account only imaging object records associated with one or more specific object classes; and
    v. predefined priorities for spatial regions, which may either be time independent or time dependent.

8. The method according to claim 1, wherein the selecting one or more advertisements on one or more outdoor advertising platforms is performed by an optimization method using one or more optimization criteria, and wherein at least one of the optimization criteria is a function of one or more of the following:
  a. the advertisement content;
  b. the advertisement duration;
  c. the advertisement format;
  d. the typical object sizes within the advertisement;
  e. the predefined priority of the advertisement;
  f. predefined priorities for spatial regions, which may either be time independent or time dependent;
  g. the current density distribution of objects in the vicinity of the outdoor advertising platform, as derived from the imaging object records;
  h. the current velocity distribution of objects in the vicinity of the outdoor advertising platform, as derived from the imaging object records;
  i. the current density distribution of objects in the vicinity of the outdoor advertising platform, as derived from the imaging object records, taking into account only imaging object records associated with one or more specific object classes;
  j. the current velocity distribution of objects in the vicinity of the outdoor advertising platform, as derived from the imaging object records, taking into account only imaging object records associated with one or more specific object classes; and
  k. the availability of a line-of-sight from the outdoor advertising platform to spatial regions of interest, wherein the spatial regions of interest are determined based on one or more of:
    i. the current density distribution of objects in the vicinity of the outdoor advertising platform, as derived from the imaging object records;
    ii. the current velocity distribution of objects in the vicinity of the outdoor advertising platform, as derived from the imaging object records;
    iii. the current density distribution of objects in the vicinity of the outdoor advertising platform, as derived from the imaging object records, taking into account only imaging object records associated with one or more specific object classes;
    iv. the current velocity distribution of objects in the vicinity of the outdoor advertising platform, as derived from the imaging object records, taking into account only imaging object records associated with one or more specific object classes; and
    v. predefined priorities for spatial regions, which may either be time independent or time dependent.

* * * * *